United States Patent Office 3,532,780
Patented Oct. 6, 1970

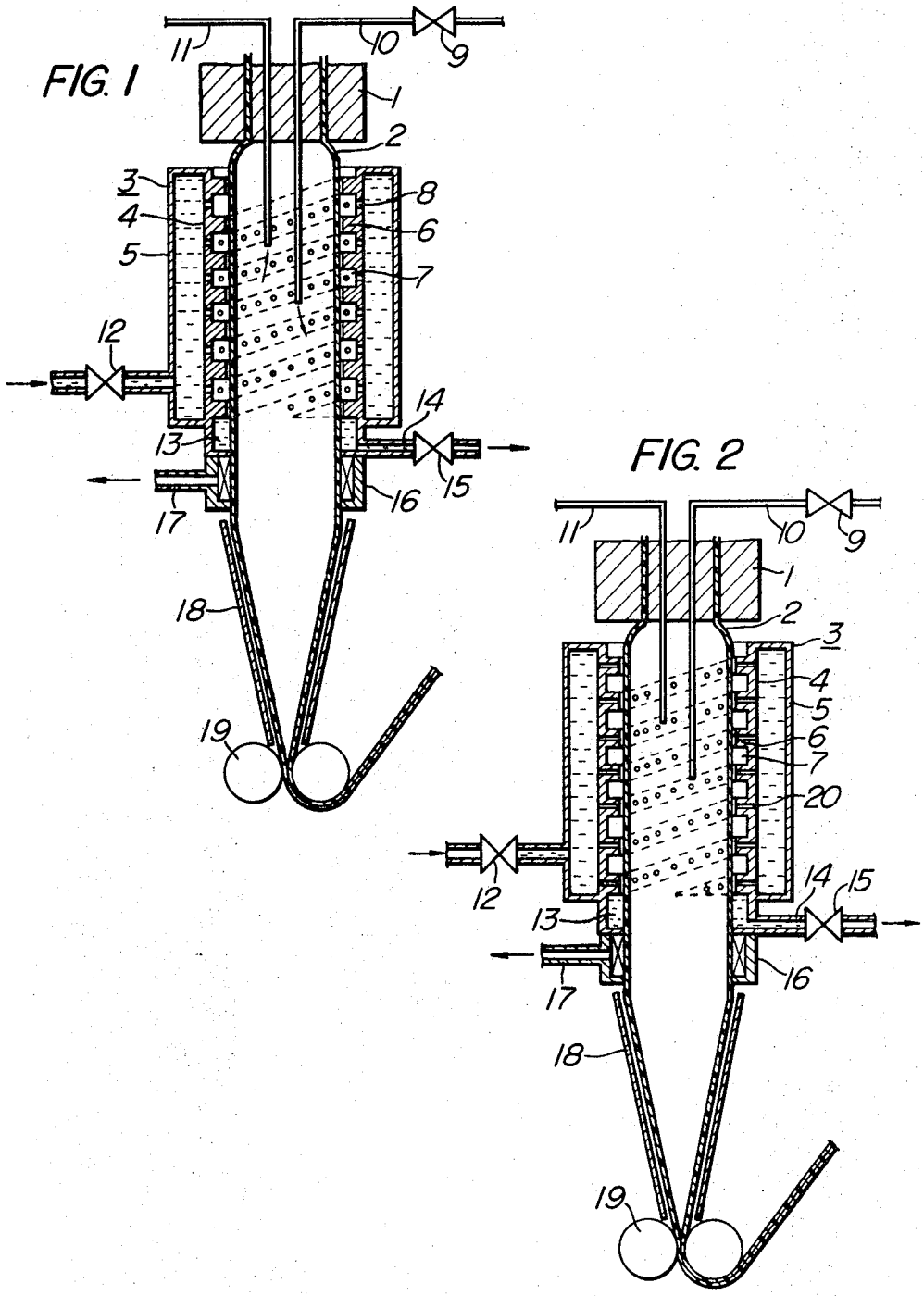

3,532,780
METHOD FOR PRODUCING A TUBULAR FILM OR TUBES OF THERMOPLASTIC RESIN
Tsutomu Kakutani, Tokyo, Yosimichi Akimoto, Chiba-shi, Masao Ueno, Tokyo, and Nobumasa Hirai, Saitama-ken, Japan, assignors to Asahi Kasei Kogyo Kabushiki Kaisha, Osaka, Japan, a corporation of Japan
Filed Sept. 8, 1967, Ser. No. 666,261
Claims priority, application Japan, Sept. 10, 1966, 41/59,628
Int. Cl. B29c 17/00
U.S. Cl. 264—95                     3 Claims

ABSTRACT OF THE DISCLOSURE

A method for producing a tubular film or tube of thermoplastic resin for stretching purpose, such as a quenched tubular film or tube of crystalline polymer, for example, polyethylene, polyethylene terephthalate or polypropylene. The tubular film or tube is produced by quenching the same through spiral contact of cooling water supplied from a plurality of cooling water inlets provided spirally on the lip of the inside wall of the cooling cylinder or the inside wall itself. By the quenching, the tubular film or tube having a beautiful surface and excellent properties can be produced.

---

This invention relates to a method for producing a tubular film or tube of thermoplastic resin for stretching purpose, and particularly a quenched film or crystalline polymer such as polyethylene, polypropylene, or polyethylene terephthalate, or stretchable film material of such crystalline polymer.

Generally, in producing a tubular film or tube for stretching, the fused tubular film extruded from a die having an annular orifice is cooled below the melting temperature by a suitable cooling means provided between the die and a flattening device positioned at a distance underneath the die, and solidified. In the conventional inflation method, a definite amount of air is blown into a fused tubular film extruded tubularly from the annular die, and a cooling air is blown onto the inflated bubble surface to cool and solidify the fused film. However, the cooling effect is so low that the area of the cooling zone must be increased to enhance the production rate. Otherwise, the production capacity will be limited due to the restricted rate of the tubular film production.

The crystal growth of crystalline polymer such as polypropylene, polyethylene or polyethylene terephthalate in the film by slow cooling and the increase in the degree of crystallization give unfavourable effect upon the practicability of the film, and particularly give unfavourable effect upon the stretchability of the film when the film is to be stretched.

On the other hand, the method for cooling and solidifying the fused film by allowing water to come in direct contact with the fused film surface has a better cooling effect on account of high specific heat of water, and such better cooling effect is not attained in the gas or solid cooling method.

As stated above, various attempts have been heretofore made to provide methods and apparatuses for producing a tubular film or tube of thermoplastic resin, but have not been completely successful in satisfying the imposed requisition of a good cooling effect, enhanced operational stability, production rate, and production of tubular film or tube of excellent physical properties.

Typical well-known prior art methods and their drawbacks are summarized below:

U.S. Pat. 2,488,571 discloses a method for quenching a fused tubular film extruded from an annular orifice by applying a cooling liquid to the outside and inside surface of the film, but has such drawbacks as it is very difficult to remove the cooling liquid retained on the inside surface of the tubular film after the film has been formed; the fluctuation in the amount of the liquid applied to the inside of the tubular film makes it difficult to maintain a hydraulic balance between the inside and outside surfaces of the tubular film and consequently makes the film surface irregular, thereby the tubular film tending to undergo a zigzag movement in the cooling zone and have an irregular tube size; and a skillful labor is required to apply the cooling liquid to the inside of the film at starting. Moreover, a stable operating condition is hardly established.

U.S. Pat. 3,090,998 discloses a method for producing a film of film-forming thermoplastic resineous material, which is characterized by extruding a fused thermoplastic, film-forming resin through an annular extrusion die downwards as a seamless tubular film, making the tube flat by a flattening means provided at a distance underneath the die, continuously applying a liquid, having a temperature adjusted to a desired temperature below the melting temperature of thermoplastic resinous material, to the outside surface of said film, so as to envelop the film, after the extrusion but prior to the flattening, and then withdrawing the flattened film from the flattening means. However, U.S. Pat. 3,090,998 has such drawbacks as the fused film is acceleratedly pulled down by the cascading liquid which envelopes the film, in case the fused polymer of a low viscosity is formed into a film; the decrease in thickness of the enveloping water film due to the acceleration of water cascading by the gravity and the water repellancy of the film bring about disruption of the enveloping water film when the water film comes to have a reduced thickness, and consequently the cooling water falls along the resin film splittedly or linearly and the uniform cooling effect is lost; and in the worst case, the linear water cascading and the resulting uneven cooling cause the bubble to break, whereby the bubble is subjected to considerable fluctuation and zigzag movement, and as a result the disruption of the enveloping cascading liquid and uneven cooling are thereby accelerated.

Further, to form a complete enveloping cascading water film makes it impossible to stabilize and regulate the bubble in the course from the starting point of cooling the fused bubble to the withdrawal point thereof through the flattening part. As a result, the bubble is brought into a completely free state, and therefore starts to fluctuate, and move in a zigzag. Finally, a continuous movement is interrupted and the production of uniformly sized film becomes difficult. In the prior art method, the complete enveloping cascading water film is disrupted and an even cooling fails to be established. In the worst case, the bubble is disrupted.

British patent specification 853,745 discloses a method for cooling a fused cylindrical film by pouring a cooling liquid or the one to which a wetting agent is added, in a film state, into a clearance between the fused cylindrical film passing through a cylindrical cooling cylinder and an inside cylinder wall. The drawbacks thereof are that the film of the cooling liquid poured into the clearance between the cylinder inside wall and the bubble outside surface is disrupted even by a slight change in the bubble size, and zigzag movement and fluctuation of the bubble; and the outside surface of the fused bubble tends to come in contact with the cooling cylinder wall; therefore, the uniform cooling fails to be maintained, and the fused bubble sticks directly to the cooling cylinder wall, and in the worse case, the bubble is disrupted.

In the prior art method, a circular supply source of a plurality of water jet streams is provided between an annular extrusion die and a cooling cylinder to prevent the fused bubble from sticking to the cooling cylinder inside wall. However, when said jet water streams hit the fused bubble, small irregular distortions are brought about on the bubble surface, and as a result the appearance of the product film is damaged.

Swiss patent application No. 47,459 (1957) discloses a method for producing a tubular film by extruding the fused thermoplastic resin upwardly and allowing the resin film to come in contact with the enveloping cylindrical porous wall through which water moves downward from the top of the cylinder by permeation. However, in the prior art method, when the high productivity must be increased, a good cooling effect cannot be attained by the limited amount of available cooling water due to the structure of porous wall.

These drawbacks as stated above are inherent in the prior art methods and apparatuses, and must be overcome. To overcome such drawbacks completely is the object of the present invention. That it to say, the disruption of water film and the uneven cooling can be overcome by the present invention, that is, by surrounding the bubble with a cooling cylinder provided with spiral lips and a plurality of cooling water supply inlets and supplying the cooling water to the clearance between the spiral lips and the film or the spiral cooling water passage uniformly as well as retaining the cooling water in said passage constantly.

Further, the drawbacks of occurence of irregularly formed film surface is completely overcome by the present invention, that is, by providing the cooling water between the tip of spiral lip and the fused bubble and effectively cooling the bubble by providing a continuous, spiral cooling water passage, which is formed by the spiral lip, the bubble, and the cooling cylinder wall.

The present invention is to provide a method for producing a tubular film or tube for the stretching purpose, which is extruded from an annular orifice die, by uniformly quenching the fused tubular film or tube in a stable, film-formed state between the die and a flattening means positioned at a distance from the die, by allowing the cooling water to come in direct contact with the film. In the present invention, the disruption of the bubble and uneven cooling due to the vibration of bubble, surging, zigzag movement of the enveloping water cascade or disruption of the water film, as stated above, are completely eliminated.

In the present invention, the fused thermopolastic organic polymer extruded from an annular orifice die at a temperature higher than the melting point is quenched to less than the melting temperature thereof and solidified without using a large amount of cooling water, whereby a tubular film or tube for the stretching purpose is produced. That is to say, the fused tubular film extruded from the annular die is quenched by passing the same through a quenching zone, where the cooling water is introduced through a plurality of cooling water inlets provided spirally on the inside surface of the cooling cylinder, passes through a spiral passage formed by the spiral lip on the inside cylinder wall, the inside cylinder wall, and the outside surface of the film, and substantially envelopes said outside surface of the film.

In the present invention, much better water cooling effect can be attained without using a large amount of water as in the conventional method, and the cooling can be uniformly conducted. Therefore, deformation and disruption of the product film can be prevented. Further, no water is introduced into the inside of the tubular film, or tube. These effects not only ensure the increase in production rate and decrease in the product cost, but also considerably save labor at the starting or during the operation.

FIG. 1 shows a vertical cross-sectional view of the present apparatus, and FIG. 2 shows a vertical cross-sectional view of the modified apparatus of the present invention.

The present method and apparatus are explained with reference to FIG. 1. The fused tubular film or tube 2 of thermoplastic organic polymer extruded from an annular orifice die 1 is led to a cooling vessel 3 of the present invention. A metallic cooling cylinder 4 for surrounding the fused tubular film or tube is provided in the cooling vessel, and a cooling water jacket 5 is provided around the outside wall of the cylinder. For simplicity of illustration, two continuous spiral lips 6 are provided on the inside wall of the cooling cylinder in FIG. 1. Two continuously spiral cooling water passages 7 are formed by the inside wall of the cooling cylinder, the spiral lips, and the moving resinous film. At least one cooling water inlet 8 is provided on the inside wall of the spiral cooling water passage between the lips to supply the cooling water from the cooling water packet 5. To allow the cooling water supplied from the jacket 5 to come in uniform contact with the fused tubular film or tube introduced into the vessel, along the outside surface of the tubular film or tube, it is preferable that the cooling water inlets 8 should be provided at equal distances in the spiral cooling water passage so that the outlets may surround the outside surface of said tubular film or tube by at least one round from the uppermost part of the lip.

When the spiral cooling water passage is at a small pitch, uneven cooling along the tubular film or tube, which takes place when it enters the vessel, may be disregarded, but when the pitch is large, it is preferable to provide an annular cooling water passage at the uppermost part of the cooling cylinder to prevent such uneven cooling. Into the inside of the fused tubular film or tube introduced into the cooling vessel is supplied a compressed air from an air inlet pipe 10 connected to a control valve 9 capable of minutely regulating the pressure and the amount of air to be supplied, and the tubular film or tube is inflated to a desired size by discharging a definite amount of air from a vent pipe 11. Cooling water supplied from a suitable water source while the air is supplied as stated above, is fed to the cooling water jacket 5 through a water supply pressure control valve 12, and supplied from the cooling water inlets provided on the cooling cylinder towards the outside surface of the tubular film or tube passing through the cylinder. The supplied cooling water entirely envelopes the outside surface of the film or tube, passes through the spiral cooling water passage 7 formed by the spiral lip, the inside wall of the cooling cylinder and the outside surface of said tubular film or tube, along the entire length of said lip 6, substantially forms a spiral, enveloping stream along the outside surface of the tubular film or tube, and rapidly cools the fused tubular film or tube down to less the melting temperature, and solidify the same. The cooling water which is supplied from the cooling water inlet 8 and passes down while it envelopes the outside surface of tubular film or tube, is discharged to the outside of the vessel through a water holder 13, discharge outlet 14, and a discharge valve 15 at the lower part of the vessel. Below the water holder 13 is provided a means 16 for completely removing water droplets retained on the surface of the tubular film or tube produced according to the present invention, and the water droplets are completely removed by the vacuum suction through a vacuum suction pipe 17.

The tubular film or tube quenched by the above method is then flattened by the successive flattening means 18 and withdrawn at a constant speed by nip rolls 19.

Modified apparatus of the present invention is shown in FIG. 2, in which the cooling effect and uniform cooling of the fused tubular film or tube is much more proved.

As explained above with reference to FIG. 1, a cooling cylinder 4 surrounded with a cooling water jacket 5 is provided in the vessel of FIG. 2, and two continuous spiral lips 6 are provided on the inside surface of the cooling cylinder 4 in FIG. 2 for simplicity of illustration. A plurality of cooling water spray inlets 20 are provided at equal distances on said spiral lips. It is preferable that an annular lip should be provided at the uppermost part of the cooling cylinder. The cooling water can be thereby uniformly and concentrically directed towards the outside surface of the tubular film of tube passing through the cooling cylinder, and thus the uneven cooling around the outside surface of the tubular film or tube which takes place when it enters the cylinder, can be prevented. However, when the spiral lips are at small pitch, such uneven cooling around the outside surface of the tubular film or tube may be disregarded. In such case, it is not always necessary to provide an annular lip at the upper-most part of the cylinder.

The difference in the structure between the apparatus of FIG. 1 and that of FIG. 2 is that in the former apparatus the cooling water is supplied into the cooling water passage 7 through the cooling water inlets provided on the inside wall of the cylinder between the spiral lips 6, whereas in the latter apparatus the cooling water is sprayed from the cooling water spray inlets 20 provided on the spiral lips 6 towards the tubular film or tube and is supplied to the cooling water passage and likewise moves down therethrough.

The fused tubular film or tube inflated to a desired size according to the manner as explained above with reference to FIG. 1 is introduced into the cooling vessel. The cooling water supplied from a suitable water source is fed to the cooling water jacket 5 through the cooling water pressure control valve 12 and sprayed from the cooling water spray inlets provided on the annular lip and the spiral lips of the cooling cylinder towards the outside surface of said film or tube passing through the cooling water passage. The sprayed cooling water completely envelops the outside surface of said film or tube, and at the same time enters the cooling water passage 7 formed by the lips, the inside wall of the cylinder and the outside surface of the tubular surface or tube. The cooling water thus substantially envelops the outside surface of the film or tube and flows down spirally along the outside surface of the film or tube, whereby the fused film or tube is rapidly cooled down to less than the metling point of the film and solidified. The cooling water which reaches the lower part of the cooling vessel, and the water droplets adhering to the outside surface of the tubular film or tube are discharged from the vessel according to the manner explained with reference to FIG. 1.

The amount of cooling water to be sprayed from the spiral lips of the cooling vessel, and the length of the spray zone can be freely adjusted by controlling the cooling water feed control valve 12 and the discharge valve 15 and sealing some cooling water spray inlets around the outside wall of the cooling cylinder, depending upon the llm-forming condition, thickness of tubular film, etc.

It is preferable to use the ordinary nip rolls as a means for withdrawing the tubular film or tube from the bottom of the cooling vessel. Nip rolls enable the film to be withdrawn at a constant rate and prevent the leakage of compressed air from the inside of the film.

In carrying out the present invention, air is most convenient and suitable compressed gas to be supplied into the inside of the tubular film or tube.

The fused tubular film or tube is quenched according to the present cooling method, and thus oxidation of film by air or other unfavorable matters are completely made free, but such inert gas as nitrogen, carbon dioxide, etc. may be used without trouble, if required.

Cooling effect of the present invention is very remarkable when compared with the conventional air-cooled inflation method, and further the present invention can make the apparatus compact and considerably improve the production rate. Furthermore, the operational difficulty at the starting or during the operation as often seem in other water-cooled film forming methods, is completely eliminated in the present invention, and a stable film formation is ensured even at the continuous operation.

In the present invention, the fused tubular film or tube is surrounded by the cooling cylinder provided with at least one spiral lip or spiral lip having a plurality of cooling water spray inlets, and thus the fluctuation and the zigzag movement of the tubular film or tube while it passes through the cylinder can be completely eliminated by the said spiral lip. Uneven cooling or in the worst case disruption of the bubble due to the disruption of enveloping water or water film owing to the fluctuation of the zigzag movement of the bubble as seen in the method which comprises pouring the enveloping, cascading water or a suitable liquid of wetting agent in a film state and cooling the fused tubular film or tube in the cooling cylinder, never appears in the present invention. Particularly, the stability of the bubble at the high speed film formation can be sufficiently maintained by the spiral lip, and thus uniformly quenched film having no uneven cooling failure can be stably produced at a high production rate by substantially continuously enveloping water film. Further, considerably higher cooling effect then obtained in the other water-cooling methods can be attained without using a large amount of cooling water, on account of intermixing and resulting stirring of the cooling water sprayed from the spiral lip with the cooling water being squeezed from the spiral lip and substantially continuously and spirally flowing down along the outside surface of the tubular film or tube.

The present invention has been explained in the foregoing with refernece to the case where a vertical apparatus is used, but of course the present invention is applicable to the horizontal apparatus.

The present method is hereunder explained with reference to example.

EXAMPLE

In order to compare the cooling effect and film formability, three films were formed according to the conventional, air-cooled inflation method; the water-cooling method as disclosed in British patent specification No. 853,745; and the present method. The air-cooling ring used in the air-cooled inflation method was 50 mm. in diameter. The water-cooling apparatus used for the comparison consisted of a bronze cooling cylinder having an inner diameter of 30 mm., and the underground water at a temperature of 15.5° C. was used for pouring the same onto the passage and cooling the cooling cylinder. The cylindrical passage surrounded by the spiral lip of the present cooling vessel was 30 mm. in inner diameter and the size of the cooling water inlet on the spiral lip was 1 mm. and the cooling water spray inlets were positioned at equal distance of 3 mm. on the spiral lip. Isotactic polypropylene having a melt flow index of 3.5 g./10 min., a density of 0.905, and an average molecular weight of 70,000 was extruded in an annular fused film state into these apparatuses through an annular orifice die having an outer diameter of 31.2 mm. and a lip clearance of 0.6 mm. by means of a 30 mm. extruder. The withdrawing speed of the nip rolls 19 was 2 m. per minute, and the bubble was inflated to a size of 30 mm. by precisely controlling the pressure of air introduced into the bubble by means of the pressure control valve 9. In any method, the polypropylene film having an average thickness of 0.27 mm. and a flat size of 46 mm. was produced. When the fused film was cooled by the cooling method based on the cooling cylinder, the water film uniformly poured into the cooling cylinder was disrupted by a slight fluctuation of the bubble, and the fused tubular film was adhered directly to the wall of the cooling cylinder. The appearance of the film was impaired by the uneven cooling, and the bubble was disrupted in a long period of continuous operation, resulting in failure in the continuous operation. Such phenomena did not take place in the present invention, and the film formability was stable throughout a long period of continuous operation. The resulting tubular film had a good and uniform appearance.

When the fused tubular film was air cooled at the same conditions, the transparency of the film was worse due to the growth of spherical crystal and the increase in the degree of the crystallization.

To investigate the degree of cooling and uniformity of cooling of the thus prepared film, the degree of crystallization and the transparency of the film in a circumferential direction at any point of the film were measured. Six measuring points at equal distance in a circumferential direction were taken as sample points, and the measurement of density was made by means of a density gradient tube using a mixed solution of n-butanol and triethylene glycol according to JIS K–676A, and the measurement of transparency was made by means of a haze meter made by Nihon Denshoku K.K. according to JIS K–6714. The results of measurement are shown in Tables 1 and 2.

As is seen from the results of measurement, the cooling effect of the present water cooling method was very remarkable, and the water-cooled film particularly with even cooling was obviously produced according to the present invention.

TABLE 1

| | Degree of crystallization, (percent) measurement of density JIS K–676A | | | | | | Average |
|---|---|---|---|---|---|---|---|
| | 1 | 2 | 3 | 4 | 5 | 6 | |
| Film produced by air-cooled inflation method | 68.48 | 70.44 | 69.88 | 70.20 | 70.60 | 69.30 | 69.82 |
| Water-cooled film by the BP No. 853745 method | 49.36 | 63.16 | 53.76 | 67.69 | 48.64 | 49.25 | 51.98 |
| Water-cooled film of the present invention | 46.25 | 46.37 | 46.37 | 46.30 | 46.35 | 46.25 | 46.32 |

TABLE 2
Film Thickness 0.27 mm. Transparency (JIS K–6714)

| | Transparency: JIS K–6714 | | | | | | Average |
|---|---|---|---|---|---|---|---|
| | 1 | 2 | 3 | 4 | 5 | 6 | |
| Film produced by air-cooled inflation method | 82.0 | 86.4 | 85.7 | 83.2 | 83.8 | 84.3 | 84.2 |
| | 86.4 | 83.3 | 92.8 | 89.0 | 89.8 | 83.6 | 88.0 |
| Water-cooled film by the BS No. 853745 method | 89.4 | 87.3 | 92.7 | 90.2 | 83.6 | 86.7 | 89.2 |
| | 15.5 | 25.1 | 23.2 | 24.1 | 20.3 | 18.6 | 21.1 |
| Water-cooled film of the present invention | 94.5 | 96.1 | 95.9 | 96.8 | 93.8 | 94.7 | 93.3 |
| | 10.5 | 12.5 | 15.0 | 10.8 | 11.2 | 15.0 | 12.2 |

REMARKS.—Figure in the upper row of each group means percent light transmissions and the lower row percent cloud points.

What is claimed is:

1. A method for producing a tubular film of thermoplastic organic polymer which comprises annularly extruding a fused thermoplastic organic polymer to form a tubular film, cooling the tubular film by passing same through a cylindrical cooling zone into which cooling water is introduced through a plurality of cooling water inlets provided spirally on the inside surface of the cooling zone, said cooling water passing through the spiral passage formed by continuous spiral projections on the inside of the cooling zone and substantially enveloping the outside surface of the film, while introducing compressed air into the inside of the fused tubular film to inflate the film whereby the outside surface of the tubular film is uniformly contacted with said projections wetted with water, flattening the cooled tubular film by successive flattening means and withdrawing it at a constant speed.

2. A method according to claim 1 wherein the fused thermoplastic organic polymer is annularly extruded at a temperature higher than the melting point thereof and the tubular film is cooled at a temperature below the melting point.

3. A method according to claim 1 wherein the thermoplastic organic polymer is polyethylene, polypropylene or polyethylene terephthalate.

References Cited
UNITED STATES PATENTS

| | | | |
|---|---|---|---|
| 2,461,975 | 2/1949 | Fuller | 264—95 |
| 2,708,772 | 5/1955 | Moncrieff | 18—19 |
| 2,814,071 | 11/1957 | Allan et al. | 264—180 X |
| 3,144,494 | 8/1964 | Geron | 264—95 |
| 3,320,637 | 5/1967 | Van Disk | 264—209 X |
| 3,346,920 | 10/1967 | Fields | 18—45 |
| 3,377,413 | 4/1968 | Jansson et al. | 264—95 |

ROBERT F. WHITE, Primary Examiner

J. H. SILBAUGH, Assistant Examiner

U.S. Cl. X.R.

18—14